Jan. 25, 1966  J. J. ZONES  3,230,901
MACHINE AND METHOD FOR MAKING PIES

Filed Sept. 17, 1962

JERRY J. ZONES
INVENTOR.

BY

ATTORNEY

Jan. 25, 1966  J. J. ZONES  3,230,901
MACHINE AND METHOD FOR MAKING PIES
Filed Sept. 17, 1962 4 Sheets-Sheet 3

FIG__3

JERRY J. ZONES
INVENTOR.

BY *Jord V. Smith*

ATTORNEY

Jan. 25, 1966   J. J. ZONES   3,230,901
MACHINE AND METHOD FOR MAKING PIES
Filed Sept. 17, 1962   4 Sheets-Sheet 4

JERRY J. ZONES
INVENTOR.
BY Jord. Smith
ATTORNEY

United States Patent Office 3,230,901
Patented Jan. 25, 1966

3,230,901
MACHINE AND METHOD FOR MAKING PIES
Jerry J. Zones, 44 McCormick Lane, Atherton, Calif.
Filed Sept. 17, 1962, Ser. No. 224,116
17 Claims. (Cl. 107—1)

This invention relates to a new and useful concept in a method and in a continuous conveyor type pie making machine and more particularly to a method and continuous conveyor type pie making machine which enables the user to introduce a continuous ribbon of dough material to one end of the machine and which with its special features cuts the ribbon of dough into sheets that fall into position on the pie molds.

A number of problems are currently encountered with conventional types pie making machines. One is that complex and costly machinery is needed to introduce the dough to the intake end of the machine and cut it into sheets for each individual mold. A related problem is that if such complicated and costly auxiliary machinery is not available equally costly labor is needed whereby the sheets must be hand-placed over each of the molds. Conventional machines also move the molds beneath the hopper holding the pie mix in such a manner that the short dimension of a mold cavity moves beneath the dispensing mechanism. In other words, the short dimension is placed parallel to the direction of conveyor travel. In this way the mix, which is usually quite viscous, will drag over the edge of the mold depression onto that portion of the dough which will form an edge of the pie. Thus, when the folded over sheet of dough is pressed together an incomplete or faulty seal is made since the mix prevents the double-over sheet of dough from being sealed.

This invention remedies the above problems and others by design and position of the molds so that they present their length dimension parallel to the direction of travel of the conveyor. In other words, the molds, contrary to standard practice, are folded or doubled over about an axis which is generally transverse to the direction of conveyor travel. In this way mix which is dispensed into the forward part of the elongated mold cavity may also drag into the rear half of the mold cavity without slopping onto the edge. As a result, any mix so dragged is not permitted to overlap on any portion of the dough sheet which will become part of the crimped or sealed edge of the pie. Thus there is assured a tight, non-leaking, dough envelope for the pie mix. Furthermore, this method and the continuous conveyor pie making machine utilize cutter bars or blades secured to the conveyor between each of the molds with the cutter bars passing beneath a roller at that end of the machine to which the continuous ribbon of dough is introduced. As the conveyor moves and as each cutter bar moves beneath the roll, the continuous ribbon is sliced into sheets appropriate to the space between each of the cutter bars, which space is substantially occupied by a pie mold.

Accordingly, it is an object of this invention to provide a pie making machine which is simple in design and economical to produce and to operate.

Another object of this invention is to supply a method and continuous conveyor pie making machine which eliminates the problem of pie mix or filling dragging or overlapping the edge area of the pie so that a seal cannot be effected.

Still another object of this invention is to furnish a method and continuous conveyor pie making machine which eliminates the costs which would result from either complicated dough cutting machinery or expensive hand labor to feed the machine.

Yet another object of this invention is to provide a method and continuous conveyor pie making machine which fully automates the process of making pies.

An even further object of this invention is to supply a continuous conveyor pie making machine which greatly reduces the number of reject pies resulting from improper sealing or fluting of edges.

A further object of this invention is to provide a method for making pies which eliminates the problem of scrap dough contaminated with filling material thus giving a better product.

These, together with objects and advantages which will become subsequently apparent, resides in the details of method operation and machine construction as more fully hereinafter described and claimed, reference being had to the accompanying drawings, forming a part hereof, wherein like numerals refer to like parts throughout, and in which:

Figure 1:
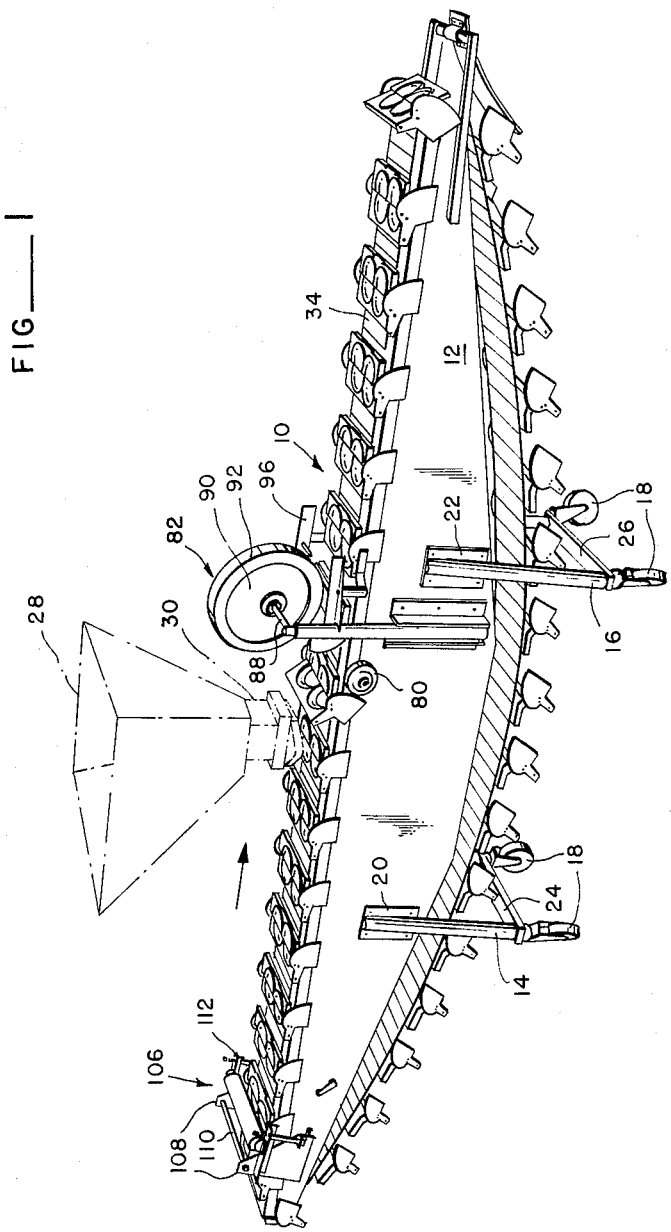
FIGURE 1 is a view in perspective showing the overall design and arrangement of the machine with respect to the dispensing apparatus.

In FIGURE 1, it will be seen that the pie machine generally referred to by the number 10 has a supporting frame of the shape shown in which the flat surface is up and the bridge type configuration faces towards the floor. The machine supporting frame has enclosing walls or sides 12 and leg structures 14 and 16. The back leg structure 14 and the front leg structure 16 are attached to the side members 12 as at 20 and 22. Back leg structure 14 is located approximately one-third the distance from the back to the front. In like manner the front leg structure 16 is located about one-third the distance from the front to the back. The back legs 14 are securely attached to sides 12 of the main frame and are interconnected by a horizontal strut 24. Similarly the front legs 16 are interconnected by a horizontal strut 26. The entire machine is made mobile by the addition of casters 18 to the leg structures so that the machine can be positioned and moved about at will with a minimum of effort.

A hopper 28 and dispensing mechanism 30 shown in dash-dot lines are part of the auxiliary equipment used in connection with this invention but the details thereof are not essential to an understanding of this invention. Hopper 28 and dispensing mechanism 30 are shown in outline form, however, so that a clear understanding of the environment of the invention and its operation are clear.

The top portions of the frame side members 12 support angle members 32. The vertical leg of each of the angle members 32 is secured to the top outside surface of each of the side members 12 with the horizontal leg of each of said angle members extending inwardly as can be seen particularly with reference to FIGURE 3. Since the angle members do not span the full width of the frame's upper surface, said upper surface is open along the central portion thereof. The continuous flexible conveyor 34 essentially is an endless belt made up of generally flat and thin, narrow, rectangular metal plates. The individual plates are linked together in side-by-side or edge-to-edge fashion so that they can pivot with respect to each other. The plates of the conveyor 34 span the distance between the angle members 32 at the top of the machine frame and overlie the horizontal legs of said members 32. The conveyor does not extend across the full width of the machine. Conveyor 34 may be driven by means which are external to the machine itself or by means which could be included within the body of the machine. In either event the driving mechanism for the conveyor 34 is not shown as it is not pertinent to an understanding of this invention. Suffice it to say that the driving means is connected to the hopper and dispensing mechanism and to the conveyor so that the dispensing mechanism is synchronized with the movement of the conveyor.

Figure 2:
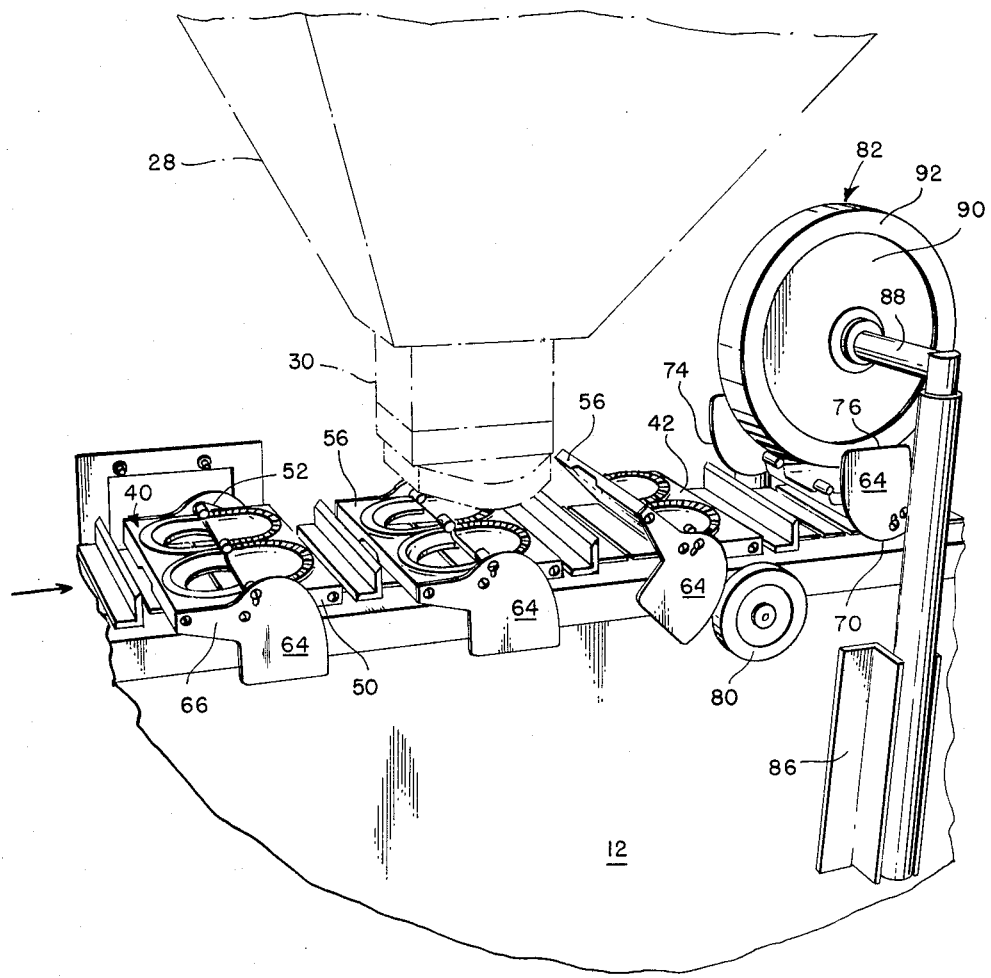
FIGURE 2 is a partial view in perspective and in greater detail of the area immediately beneath and forward of the dispensing apparatus showing the camming mechanism for moving the back or top half of the mold onto the forward or bottom mold portion.

The pie molds basically are two piece elements; one section of which is secured to the conveyor 34 and the other section of which pivots with respect to the secured portion. The molds, designated by the number 40, comprise a forward mold plate 42 which in outline form is a block of suitable mold material such as aluminum, or stainless steel, or plastic, or the like. The molds extend across the width of the conveyor frame. In fact the molds 40 are slightly wider than the machine itself. Forward plate 42 is, as mentioned above, secured to the conveyor. Its upper surface carries two elongated semicircular depressions 44 formed so that they open to the back edge of the plate 42. The semicircular depressions 44 are placed in side-by-side relationship and are defined by a fluted edge 46 which is slightly raised above the normal surface of said plate. Depressions or cavities 44 by virtue of raised fluted edges are slightly greater in depth than would be possible if they were simply formed in the block 42 without said raised edges. As can be seen, particularly with reference to FIGURES 2, 3 and 6, the fluted edge is of limited width in comparison with the entire depression. The fluted edges 46 of each of the two side-by-side depressions 44 reach nearly to the forward edge 48 of plate 42.

Each end of plate 42 is provided with a hinge plate 50 which conforms to the generally rectangular side configuration of the block 42 except that said hinge plate 50 has an ear 52 near the back edge of said plate 42 which is slightly raised above the surface of the plate. Said hinge mountings 52, of course, are at each end of the plate 42 and provide the means by which the back section or plate 56 of the mold 40 is pivotally connected to the front section or plate 42. Raised pivot bearings or guides 54 are provided at the termination of each of the fluted edges 46 at the back edge of plate 42. Said pivot bearings insure that the back plate 56 of the mold pivots upwardly to overlie, in a proper alignment, the front plate 42 of the mold.

The rear section 56 of mold 40 is also generally rectangular in shape and slightly longer than plate 42 and of about the same width. Two elongated semicircular or U-shaped side-by-side raised edge portions open onto the front edge of said plate 56. Said edges 58 are designed so that when the back plate 56 is pivoted upwardly and over onto plate 42 the edges 58 will overlie in superposed position the fluted edges 46. In contrast with the depressions 44 in the front plate 42, however, the rear mold portions are partially cut out of the plate 56 leaving a sloping semicircular surface 60 terminating in a lower edge 62, of a lesser radius of curvature than mold edge 58.

Each end of plate 56 is provided with an actuating cam generally shown by the number 64. Each cam 64 has an elongated portion 66 which is connected to one end of back plate 56 by screws 68. Portion 66 conforms substantially to the end configuration of plate 56. Near the front edge of said plate 56 the cam curves upwardly as at 70 so that a pivot connection between the two plates may be made between said cam 64 and the ears 52 on the front plate. A fastener 72 connects said cam 64 and the fixed ears 52 so that a pivotal connection is made. The cam from its raised area 70 defines a downwardly and forwardly curving edge 74 which extends alongside the forward half of the plate 42 and downwardly below the surface of the conveyor to a greater distance than the cam 64 extends above the conveyor at its highest point 70. A lower edge 76, joining the curving edge 74, defines the bottom-most portion of said cam 64 and extends back from the curved edge 74 horizontally to a point which is rearwardly of the rear edge of plate 42 and rearwardly of the front edge of plate 56. The cam 64 is further defined by a rear cam edge 78 which extends generally upwardly to the elongated portion 66.

As mentioned above rear plate 56 is only slightly longer than forward plate 42 together with its end plates 50. In this manner a cam 64 is capable of being attached to each end edge of plate 56 and at the same time straddle the ends of said plate 42. Said rear plate, of course, is long enough so that sufficient clearance is allowed between the cam 64 and the plate 50 to prevent any binding of the cam to the forward plate.

As mentioned above the back plate 56 pivots about the fasteners 72 which pass through the ears 52. The generally round guide bearings 54 are on and above the back edge of plate 42 and are also coaxial with the fasteners 72. As will be appreciated, the back plate 56 is pivoted and superposed upon plate 42 after a sheet of dough has been placed over the entire mold 40 in its flat position and the mixed deposited thereon. Immediately upon leaving the area beneath dispenser 30, cams 64 of the mold 40, specifically each leading edge 74, engage a small wheel 80 which is rotatable about a fixed axis. As the conveyor moves forwardly the back plate 56 is swung upwardly around the pivots 72 (see FIGURES 2 and 4) until it rests superposed upon plate 42. Thus the bottom edge 76 of cam 64 is now in the position of being the uppermost part of the cam. The cam wheels 80 are placed on both sides of the frame in coaxial alignment so that the camming action which throws back plate 56 over onto plate 42 is performed on both sides.

After the sheet of dough has been provided with mix in the mold cavity and the back plate 56 doubled over, the mold proceeds under the pressure arrangement generally shown by the number 82. Spaced forwardly from the camming wheels 80 and on each side of the machine frame is an upstanding structural member 84 connected securely to the sides 12 of the machine by brackets 86. The vertical structure members 84 extend substantially above the conveyor 34. A shaft 88 spans the distance between the upper end of said structural members 84. Wheel 90 has a periphery or rim 92 made of resilient material such as rubber or neoprene or plastic or the like and is journaled on shaft 88 and centered over and above conveyor 34 and the molds 40. Rim 92 of wheel 90 contacts the underside of back plate 56 as it passes beneath said wheel.

It should be mentioned that the structural members 84 are tubular in nature and contain therein a spring (not shown) which is connected in a conventional and well known manner to a shaft support element 85 which is telescopically received within the tubular structural member 84. Thus the wheel 90 on shaft 88 is capable of some degree of vertical movement in addition to its free rotational ability on the shaft. Normally the position of rim 92, i.e., the distance by which its lowermost point clears the conveyor, would be somewhat less than the combined thickness of plates 56 and 42. As the doubled over mold proceeds under the wheel the wheel is able to move upwardly against the pressure of the springs located within structural members 84. In this manner, a firm pressure is brought to bear to squeeze the two molds together. This pressure operation has a twofold object.

The generally smooth edges 58 on back plate 56 are pressed downwardly at considerable pressure on the edges 46 of the front plate 42 to effect a firm seal for the envelope of dough in which the mix is held and to cut excess dough away from the edges of the pie. As the mold proceeds from under the wheel, pies are completely formed and excess dough has been separated from the main body of the pie.

Figure 3:
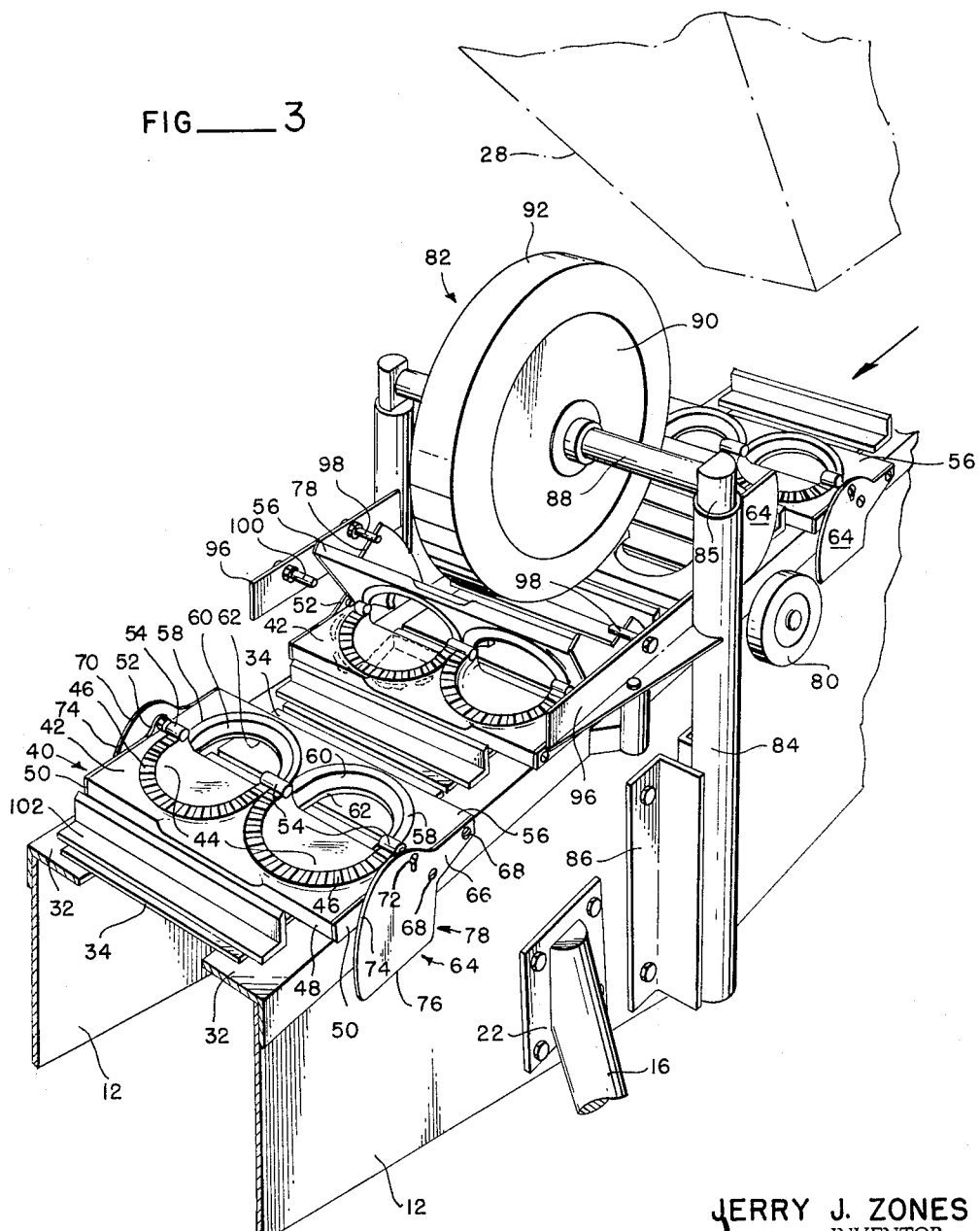
FIGURE 3 is another partial view in perspective showing the camming operation for opening the molds after the dough has been filled and pressed and cut beneath the pressure wheel.

For illustrative purposes, in just one location in FIGURE 3, a portion of a pie and excess dough are shown.

Figure 4:
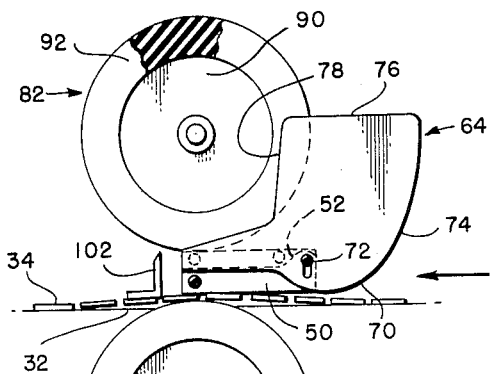
FIGURE 4 is a diagrammatic view showing the arrangement of the pressure wheels between which each mold passes after the dough sheet has been filled with mix and doubled over.
Figure 7:
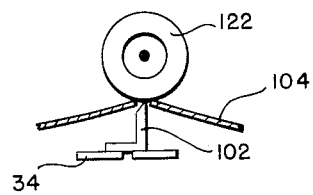
FIGURE 7 is a diagrammatic view showing the manner in which the ribbon of dough is cut as it moves on the conveyor cutter bars beneath the roller.

FIGURE 4 indicates that another wheel 94 is located under the conveyor within the confines of the machine between its sides 12 directly below wheel 90. Said lower wheel 94 provides a rotatable, non-resilient, firm base against which the upper pressure wheel 90 can perform its pressure operations without overloading or stopping the conveyor drive mechanism..

As the doubled over mold proceeds out from under pressure wheel 90 the edge 78 of cam 64 is the means by which the back plate 56 is pivoted off front plate 42. Extending forwardly from each of the tubular structural members 84 above the level of the doubled over mold but below the level of cam edge 76 are brackets 96. The brackets are securely connected to structural members 84 and are placed in a generally horizontal position substantially parallel to the side of the frame. Protruding inwardly from the inside surface of each bracket 96 in a direction transverse to conveyor movement are first abutment pins 98. Said abutment pins extend inwardly from the bracket just far enough to intercept the cam edges 78 as the mold moves forwardly from under wheel 90. First abutment pins 98 are located approximately one-third the distance from the back end to the front end of each bracket 96 and they are, of course, aligned so that cam edges 78 on each side of the mold strike the abutment pins at the same instant. As cam edges 78 strike abutment pins 98 back plate 56 begins to swing off plate 42. Located forwardly at approximately the same level on one or both of the brackets 96 are second abutment pins 100. These second abutment pins are located approximately two-thirds the distance from back to front ends of said brackets 96. The second abutment pins intercept the mold sides of plates 56 when cams 64 free themselves of abutment pins 98. Because plate 56 is not yet fully pivoted to an upright position the forward abutment pins 100 swing plate 56 past the vertical position so that it then falls of its own weight into its down position. In this manner a completed pie, indicated only in one location in FIGURE 3, is left in each of the two side-by-side molds in the forward plate 42 and the pies themselves need only be removed from the molds. Superfluous dough is carried to the forward end of the machine, where it falls into a receptacle.

Figure 5:
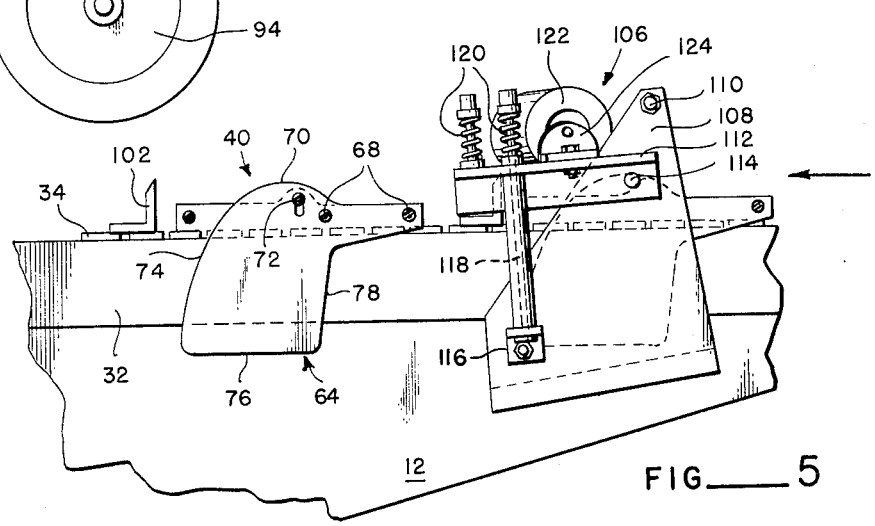
FIGURE 5 is a partial side elevational view of the front end of the machine to which the continuous ribbon of dough is introduced showing the simple relationship of cutter bars and roller by which the continuous ribbon of dough is cut into individual sheets.

FIGURES 1 and 5 through 7 show the means by which a continuous ribbon of dough of the proper thickness is introduced to the back end of the machine and cut into sheets. It will be noted that a series of L-shaped cutter blades 102 are alternately placed and secured to the conveyor between any two molds 40. The cutter blades 102 are pieces of angle metal with the upper or upright leg beveled at the top edge. The cutter blades 102 have not been shown in FIGURE 1 since it was found that including them in an overall drawing presented too cluttered a picture. However, the remainder of the drawings do show said cutter blades. Said cutter blades, particularly as shown in FIGURE 5, are slightly higher than the mold 40 when it is in its unfolded position, but must not be so high as to interfere with the operation of pressure wheel 90 when it encounters molds 40 in the doubled over position.

Figure 6:
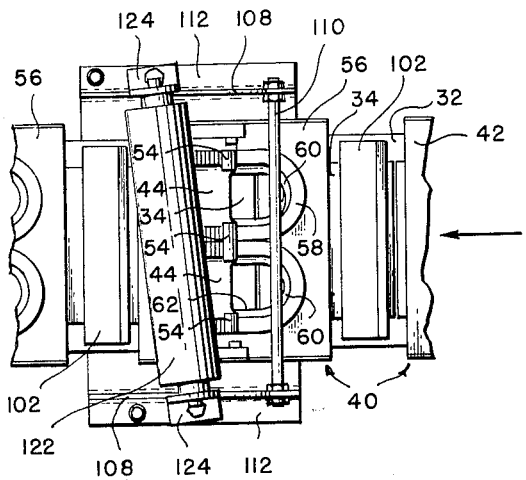
FIGURE 6 is a top plan view of the mechanism shown in FIGURE 5.

The cutter blades moving by and cooperating with the roller structure 106 as shown in FIGURE 5 serve to cut the continuous ribbon of dough 104 (see FIGURE 7) into individual sheets. The roller and its supporting structure assembly 106 is made up of two essentially triangular support plates 108 secured to and spaced from the sides 12 of the machine frame as shown in FIGURE 6. The plates 108 are spaced from sides 12 for the obvious reason of removing obstructions from the path of cams 64. Attachment, of course, is made at the bottom of plates 108 below the lowermost point of cam 64. The upper ends of the plates 108 extend above the conveyor and above the cutter blades 102 and of course the molds 40. The plates are positioned generally opposite each other on the sides 12 and a tie rod 110, holds them together to add rigidity to the structure.

Located on the outside of each of the plates 108 is a short length of angle rail 112. The vertical leg of angle 112 is against plate 108, while the other leg extends outwardly from the top of said rail. Said rail 112 is pivotally secured to plate 108 by pivot pin 114. The top surface of rail 112 is at a level slightly above the top of the mold 40 and the cutter blades 102. Rail 112 extends forwardly, generally parallel to the sides 12 of the machine frame. An L-shaped rail support bracket 116 is located nearer the lower front end of the triangular plate 108 and secured thereto. As shown in FIGURE 5, a tubular shaft 118 extends between the support bracket 116 and has a shoulder engaging the underside of the other leg of rail 112, thus supporting the rail 112 at its forward end. A shaft means, as for example a long bolt, extends upwardly through tubular shaft 118, through the other leg of rail 112, and terminates at approximately the same level as the upper end of plate 108. A compression spring assembly 120 is secured to the upper end of the bolt by appropriate nut means, so that while rail 112 is restrained from downward motion by the tubular shaft 118 it is, nevertheless, capable of moving upwardly against the pressure of spring 120.

The precise angle at which rail 112 is supported with respect to the plane of the conveyor, is critical only insofar as it determines the position of the roller 122. Each of the rails 112 has on the upper side of its other leg a semi-circular roller support bracket 124. One bracket 124 is located nearer the forward end of its rail 112 than the support bracket 124 on the other rail as shown in FIGURE 6. In this way when the roller 122 is mounted in the support brackets 124 it is disposed at an angle to the direction of the conveyor movement. In this manner the cutter blades 102 do not encounter the roller 122 with such a sharp impact so as to perhaps nick or in some other way mar the surface of the roller or the upper edges of the cutter blades. As the continuous ribbon of dough 104 is brought onto the back end of the machine at the same rate of speed at which the conveyor 34 is moving, said ribbon of dough overlies the mold 40, and also the cutter blades. The apparatus (not shown) for forming the ribbon of dough 104 may include several stages of rollers which shape the dough into a ribbon the width of the conveyor with the last stage of rollers operating at a peripheral speed equal to the conveyor speed. But, as the conveyor, together with the cutter blades and the molds, moves under the roller the roller presses the dough against the beveled edge of the cutter blades 102, thus slicing said dough to form a sheet from the continuous ribbon. The roller, of course, is positioned in height so that a certain amount of pressure exerted by the compression springs 120 is sufficient to bring the roller into contact with the cutter to sever the ribbon of dough at that point.

The method of this invention involves the use of a pie mold element comprised of two plates hinged to each other, the two plates together forming either a single cavity or a plurality of cavities disposed in side-by-side relationship. The hinging axis is disposed substantially crosswise to the direction of mold travel on the conveyor so that one half of the mold element can be conveniently cam pivoted onto the other. It is preferable to arrange any longer dimension of any mold cavity parallel to the direction of travel of the mold increasing the filling time tolerance.

A sheet of dough will thus be severed from the dough ribbon and placed over the mold. The mold will then be moved under a pie filling or mix dispensing mechanism synchronized to the movement of the mold. As the mold in its flat position passes beneath the dispenser a predetermined quantity of filling is released to drop into the forward portion of the mold cavity. If however, any mix drops into the rear portion of the cavity, there is little danger this so-called drag will lap over the edge of the mold cavity to cause an imperfect seal when the dough is folded over and/or to spill out of the pie contaminating the scrap dough.

After filling has been achieved the molds are doubled over to superpose the rear half of the mold onto the front half, thus folding the sheet of dough into an envelope. The molds are then passed beneath a pressure wheel which seals the envelope by virtue of the mold edge design and which at the same time cuts away excess or scrap dough. When the mold has passed from under the pressure arrangement the top or rear half is pivoted off the bottom or front half leaving the completed pie in the forward half of the cavity. The pie is then ready to be removed for frying.

The foregoing is considered as illustrative only of the principle of this invention. Numerous modifications will occur to those skilled in the art, but it is not desired to limit the invention to the exact construction and method of operation shown and described. Accordingly, all suitable modifications and equivalents may be resorted to falling within the scope of the invention.

What is claimed is:

1. A method for making pies, comprising: (1) continuously moving a pie mold covered with a sheet of dough beneath a pie mix dispensing mechanism, said pie mold having forward and rear portions pivotally connected together with the axis of said pivot connection extending generally transverse to the direction of travel of said pie mold, said pie mold also including at least one elongated mold cavity defined in both of said forward and rear portions; (2) depositing a predetermined quantity of pie mix from said dispensing mechanism onto said sheet of dough and in the forwardmost area of said mold cavity while said pie mold is moving; (3) pivoting the rear portion of said pie mold onto said forward portion so that the section of said cavity defined in the rear portion is superposed upon the section of said cavity defined in the forward portion; (4) pressing the superposed mold portions together to seal the dough and cut away scrap dough; and (5) pivoting said rear portion of said pie mold off said forward portion to expose the completed pie.

2. A method for making pies, comprising: (1) continuously moving a pie mold; (2) placing a sheet of dough over the traveling pie mold, said pie mold being comprised of two portions hinged together with the axis of said hinge extending generally transverse to the direction of travel of said pie mold, said portions together defining at least one upwardly facing elongated mold cavity with the longest dimension of said cavity being generally parallel to the direction of travel of said pie mold; (3) continuously moving said pie mold with said sheet of dough beneath a pie mix dispensing mechanism; (4) depositing a predetermined quantity of pie mix from said dispensing mechanism onto said sheet of dough and in the forwardmost part of said mold cavity while said pie mold is moving; (5) pivoting one portion of said pie mold onto the other portion so that substantially equal sized cavity areas are superposed one upon the other; (6) pressing the superposed portions together to seal the dough and cut away scrap dough; and (7) pivoting said one portion of said pie mold off said other portion to expose the completed pie.

3. A method for making pies, comprising: (1) continuously moving a pie mold covered with a sheet of dough beneath a pie mix dispensing mechanism, said pie mold having forward and rear portions pivotally connected together with the axis of said pivot connection extending generally transverse to the direction of travel of said pie mold, said pie mold also including at least one elongated mold cavity defined in both of said forward and rear portions; (2) depositing a predetermined quantity of pie mix from said dispensing mechanism onto said sheet of dough in one portion of the mold cavity while said pie mold is moving; (3) pivoting the other unfilled portion of the pie mold onto the said filled portion so that the section of the said cavity defined in the unfilled portion is superposed upon the section of the said cavity defined in the filled portion; (4) pressing the superposed mold portions together to seal the dough and cut away scrap dough; and (5) pivoting said unfilled portion of said pie mold off said filled portion to expose the completed pie.

4. A method for making pies comprising: (1) continuously moving a pie mold covered with a sheet of dough beneath a pie mix dispensing mechanism, said pie mold having forward and rear portions pivotally connected together with the axis of pivotal connection extending transverse to the direction of travel of said pie mold, said mold also having a pie forming area defined by both said forward and rear portions underneath said sheet of dough; (2) depositing a predetermined quantity of pie mix from said dispensing mechanism onto said sheet of dough and in said pie forming area while said mold is moving with the center of said predetermined quantity of pie mix positioned substantially forwardly from said axis of pivotal connection; (3) folding said forward and rear mold portions together about said pivotal axis with said sheet of dough and said pie mix positioned between said mold portion; (4) pressing the mold portions together to seal the dough and cut away scrap dough; and (5) unfolding said mold portions about said pivotal axis to expose the completed pie.

5. A pie making machine comprising: a frame having a generally flat upper surface, a continuous conveyor means adapted to be driven from rear to front of the frame along the length of said flat upper surface, a plurality of pie molds attached to said conveyor means and uniformly spaced from each other along the length of said conveyor means, each of said pie molds including front and rear mold portions pivotally connected together at an axis of pivotal connection with the axis of pivotal connection extending transverse to the direction of travel of said conveyor means, each of said molds also having a pie forming area defined by both said mold portions, a pie mix dispensing station positioned above said upper surface for depositing a predetermined quantity of pie mix upon dough sheets carried by the molds in the pie forming area thereof with the center of said quantity of pie mix positioned substantially forwardly from the pivotal axis of the mold portions of said mold, folding means mounted adjacent to said conveyor means forwardly from said dispensing station for folding said mold portions together about said pivotal axis with materials deposited on said mold positioned between said folded mold portions, pressure means mounted adjacent to said conveyor means forwardly from said folding means for pressing said folded mold portions together, and mold unfolding means mounted adjacent to said conveyor means forwardly from said pressure means for unfolding said mold portions about said pivotal axis.

6. A pie making machine, comprising: a frame having a plane upper surface, a continuous conveyor means adapted to be driven from rear to front of the frame along the length of said plane upper surface; a plurality of pie molds attached to said conveyor means and uniformly spaced from each other along the length of said conveyor means, each of said pie molds including a front mold plate having at least one straight edge and a generally semicircular mold depression therein, said pie mold also having a rear mold plate hingedly attached and freely pivotal with relation to said front plate along their respective straight edges and said conveyor means and also having at least one straight edge and a generally semicircular mold depression therein, said front mold depression and said rear mold depression when open being aligned and adjacent each other along their respective straight edges to form a generally elongated mold cavity, said rear plate also having cam means on each side thereof; first cam actuating means located on the sides of said frame for intercepting said cam means and for pivoting said rear mold plate onto said front mold plate so that said rear mold depression is superposed upon said front mold depression; pressure means for pressing the superposed mold plates together as the mold passes beneath said pressure means; second cam actuating means on the frame for pivoting said rear plate off said front plate; upstanding cutter means disposed between each pair of molds; and a roller means located at the rear of said frame and overlying said conveyor means and said molds and said cutter means to coact with said cutter means to create a cutting action as each cutter means passes by the roller means adapted to cut into sheets, a continuous ribbon of dough, when it is introduced to the rear end of said conveyor means.

7. A pie making machine, comprising: a frame having a plane upper surface, a continuous conveyor means adapted to be driven from rear to front of the frame along the length of said plane upper surface and adapted to pass beneath a dispensing mechanism located approximately midway along the length of said flat upper surface; a plurality of pie molds attached to said conveyor means and uniformly spaced from each other along the length of said conveyor means, each of said pie molds including a front mold plate having a straight edge and a generally semicircular mold depression therein, said pie mold also having a rear mold plate hingedly attached and freely pivotal with relation to said front plate and said conveyor means and also having a straight edge and a generally semicircular mold depression therein, said front mold depression and said rear mold depression when opened being aligned and adjacent each other along their respective straight edges to form a generally elongated mold cavity, said cavity extending generally in the direction of travel of said conveyor means, said rear plate also having cam means on each side thereof extending downwardly below the level of said upper surface of said frame and in spaced relation to the sides of said frame; first cam actuating means located on the sides of said frame for intercepting said cam means to pivot said rear mold plate onto said front mold plate so that said rear mold depression is superposed upon said front mold depression; resilient pressure means supported above and generally centrally of said conveyor means and said molds for pressing the superposed mold plates together as the mold passes beneath said resilient pressure means; second cam actuating means in the said frame for pivoting said rear plate off said front plate; cutter means disposed between each pair of molds; and roller means located at the rear of said frame, overlying said conveyor and said molds and said cutter means to coact with said cutter means to create a cutting action as each cutter means passes by the roller means adjacent thereto to cut into sheets a continuous ribbon of dough when such a ribbon is introduced to the rear end of the conveyor means.

8. A pie making machine, comprising: a frame having a plane upper surface; a continuous conveyor means adapted to be driven from rear to front of the frame along the length of said upper surface and adapted to pass beneath a dispensing mechanism located approximately halfway along the length of said upper surface; a plurality of pie molds attached to said conveyor means and uniformly spaced from each other along the length of said conveyor means, each of said pie molds including a front mold plate, having a straight edge and generally semicircular side-by-side mold depressions therein, said pie mold also having a rear mold plate hingedly attached and freely pivotal with relation to said front plate along their respective straight edges and said conveyor means and also having a straight edge and side-by-side generally semicircular mold depressions therein, said front mold depressions and said read mold depressions when opened being aligned and adjacent each other along their respective straight edges to form generally elongated mold cavities, said rear plate also having cam means on each side thereof; first cam actuating means located forwardly of said dispensing mechanism on the sides of said frame for intercepting said cam means to pivot said rear mold plate onto said front mold plate, so that said rear mold depressions are superposed on said front mold depressions; pressure means located forwardly on said first cam actuating means positioned above and centrally of said conveyor means for pressing the superposed mold plates together as the mold passes beneath said pressure means; second cam actuating means on the frame for pivoting said rear plate off said front plate; upstanding generally L-shaped cutter blade means disposed between each pair of molds and extending upwardly a slight distance above the depth of said front and rear mold plates; and a roller means located at the rear of said supporting frame means overlying said conveyor means and said molds and said cutter blade means to coact with said cutter blade means to create a cutting action as each cutter blade means passes by the roller means adapted to cut into sheets, a continuous ribbon of dough, when it is introduced to the rear end of said conveyor means.

9. A pie making machine, comprising: a frame having a plane upper surface; a continuous conveyor means adapted to be driven from rear to front along the length of said plane upper surface; a plurality of pie molds uniformly spaced from each other and attached to said conveyor means along the entire length thereof, each of said pie molds having a front mold plate and a rear mold plate hingedly attached to such front plate for free pivotal movement with respect to such front plate and said conveyor means, said front and rear plates forming mold cavities and said rear plate having cam means on each end thereof; first cam actuating means located on the sides of said frame for intercepting said cam means and for pivoting said rear mold plate onto said front mold plate; pressure means, including a wheel for pressing the superposed mold plates together as the mold passes beneath said wheel; second cam actuating means on said frame for pivoting said rear plate off said front plate; cutter means disposed between each pair of molds; and a roller means located at the rear of said frame and overlying said conveyor means and said molds and said cutter means to create a cutting action as each cutter passes by the roller means adapted to cut into sheets a continuous ribbon of dough, when it is introduced to the rear end of said conveyor.

10. A pie making machine, comprising: a frame having a plane upper surface; a continuous conveyor means adapted to be driven from rear to front along the length of said upper plane surface and adapted to pass beneath a dispensing mechanism located approximately midway along the length of said flat upper surface; a plurality of pie molds, uniformly spaced from each other and attached to said conveyor means along the entire length thereof, each of said pie molds having a front mold plate and a rear mold plate, hingedly attached to said front plate for free pivotal movement with respect to said front plate and said conveyor means, said front and rear plates forming mold cavities and said rear plate having cam means on each end thereof; first cam actuating means located on sides of said frame for intercepting said cam means to pivot said rear mold plate onto said front mold plate; rotatable resilient pressure means supported above and generally centrally of said conveyor means and said mold for pressing the superposed mold plates together as the mold passes beneath said rotatable resilient pressure means; second cam actuating means on the said frame for pivoting said rear plate off said front plate; cutter means disposed between each pair of molds; and roller means located at the rear of said frame, overlying said conveyor means and said molds and said cutter means to coact with said cutter means to create a cutting action as each cutter means passes by the roller means adapted to cut into sheets, a continuous ribbon of dough, when it is introduced to the rear end of said conveyor means.

11. A pie making machine, comprising: a frame having a plane upper surface; a continuous conveyor means adapted to be driven from rear to front along the length of said upper surface and adapted to pass beneath a dispensing mechanism located approximately halfway along the length of said upper surface; a plurality of pie molds uniformly spaced from each other and attached to said conveyor means along the entire length thereof, each of said pie molds having a front mold plate and a rear mold plate hingedly attached to front plate for free pivotal movement with respect to said front plate and said conveyor means, said front and rear plates forming mold cavities and said rear plate having cam means on each end thereof; first cam actuating means located forwardly of said dispensing mechanism on the sides of said frame for intercepting said cam means to pivot said rear mold plate onto said front mold plate; pressure means located forwardly of said first cam actuating means and including a wheel positioned above and centrally of said conveyor means for pressing the superposed mold plates together as the mold passes beneath said wheel; second cam actuating means on the frame for pivoting said rear plate off said front plate; upstanding generally L-shaped cutter blade means disposed between each pair of molds, and extending upwardly a slight distance above the depth of said front and rear mold plates; and a roller means located at the rear of said frame and overlying said conveyor means and said mold and said cutter blade means to coact with said cutter blade means to create a cutting action as each cutter blade means passes by the roller means adapted to cut into sheets, a continuous ribbon of dough, when it is introduced to the rear end of said conveyor means.

12. A pie making machine, comprising: a frame having a plane upper surface; a continuous conveyor means adapted to be driven from rear to front along the length of said upper surface; a plurality of pie molds uniformly spaced from each other and attached to said conveyor means along the entire length thereof, each of said pie molds including a generally rectangular front mold plate extending from side-to-side of said upper surface and having mold depressions on the upper surface which open upon the rear edge of said plate, said pie mold also having a generally rectangular rear mold plate extending from side-to-side of said plane upper surface and being hingedly attached to said front plate for free pivotal movement with respect to said front plate and said conveyor means, said rear plate having mold depressions therein extending to the front edge thereof in alignment with and combining with said front plate depressions to form elongated mold cavities, said rear plate also having cam means on each side thereof; first cam actuating means located on the sides of said frame for intercepting said cam means and for pivoting said rear mold plate onto said front mold plate so that said rear plate mold depressions are superposed upon said front plate depressions; pressure means for pressing the superposed mold plates together as the molds pass beneath said pressure means; second cam actuating means on said frame for pivoting said rear plate off said front plate; cutter means disposed between each pair of molds; and a roller means located at the rear of said frame and overlying said conveyor means and said mold and said cutter means to coact with said cutter means to create a cutting action as each cutter means passes by the roller means adapted to cut into sheets, a continuous ribbon of dough, when it is introduced to the rear end of said conveyor means.

13. A mold adapted to be attached to the continuous conveyor of a pie making machine, comprising: a front mold plate having a generally semicircular mold depression therein, said front mold plate having an attachment structure adapted to be attached to said conveyor and having hinge means having a hinge axis perpendicular to the direction of travel of said conveyor on which said attachment structure may be attached, said pie mold also having a rear plate having hinge means hinged to said front plate hinge means for rotation about said hinge axis and having a generally semicircular mold depression therein, said front mold depression and said rear mold depression being aligned and facing each other to form a generally elongated circular cavity, said rear plate also having cam means on each side thereof spaced from the mold depression therein.

14. A mold adapted to be attached to a traveling continuous conveyor means of a pie making machine, comprising: a front mold plate having at least one mold depression therein, said front mold plate having a front plate hinge means with a hinge axis, said pie mold also having a rear mold plate having a hinge means hinged to said front plate hinge means and having at least one mold depression therein, one of said mold plates having an attachment structure adapted to attach said mold plates to said conveyor means with said hinge axis perpendicular to the direction of travel of said conveyor means, said front mold depression and said rear mold depression being aligned and facing each other to form a generally elongated mold cavity, generally in an intended direction of travel; and the other one of said mold plates also having cam means on each side thereof spaced from the mold depression therein.

15. A mold adapted to be attached to a continuous conveyor of a pie making machine, comprising: a front mold plate having generally semicircular side-by-side mold depressions therein, said front mold plate having an attachment structure adapted to be attached to said conveyor means and having hinge means having a hinge axis perpendicular to the direction of travel of said conveyor to which said attachment structure may be attached, said pie mold also having a rear mold plate having hinge means hinged to said front plate hinge means for rotation about said hinge axis and also having side-by-side generally semicircular mold depressions formed therein, said front mold depression and said rear partial mold depression defining central depressions being aligned and facing each other to form generally elongated mold cavities; and said rear plate also having cam means on each side thereof spaced from the mold depression therein.

16. A method for making pies, comprising: (1) placing a continuous sheet of dough over a pie mold moving on a conveyor means, said pie mold being comprised of forward and rear portions hinged together with the axis of said hinge extending generally transverse to the direction of travel of said pie mold on the conveyor means, said mold also including at least one elongated mold cavity approximately half of which is formed in each of said forward and rear portions of said pie mold; (2) continuously moving on conveyor means supporting the mold said pie mold with said sheet of dough to pass beneath a pie mix dispensing mechanism; (3) depositing a predetermined quantity of pie mix from said dispensing mechanism onto said sheet of dough and in the forward half of said mold cavity while said pie mold is moving; (4) pivoting the rear portion of said pie mold onto said forward portion so that the portions of said mold cavity are superposed one upon the other; (5) pressing the superposed mold portions together to seal the dough and cut away scrap dough; and (6) pivoting said rear portion of said pie mold off said forward portion to expose the completed pie.

17. A pie making machine, comprising: a frame having a plane upper surface; a continuous conveyor means adapted to be driven along the length of the said plane upper surface; a severing means arranged relative to the frame and conveyor to create a severing action for severing dough sheets near the commencement of the plane upper surface of the frame; a plurality of pie molds attached to said conveyor means to be advanced with severed dough sheets thereon uniformly spaced, each of said pie molds including two mold portions hinged together for pivotal movement relative to one another about a pivotal axis, said severing means comprising a plurality of knives attached to said conveyor means with one knife extending transversely of said conveyor means between adjacent pie molds and a transverse roller mounted on said frame above said conveyor means for rolling engagement with said knives, one mold portion having a depression on its upper surface, the other mold portion having a depression in its upper surface, the depressions of these respective mold portions forming a mold cavity, the molds having cam means; a first mold cam actuating means on the frame to intercept the mold cam means causing a first cam action to pivot said one mold portion directly over said other mold portion; pressure means secured to the frame for pressing the superposed mold portions together as the pie mold passes by the pressure means; and a second mold cam actuating means to intercept the mold cam means causing a second cam action to pivot said one mold portion off said other mold portion.

References Cited by the Examiner

UNITED STATES PATENTS

| | | | |
|---|---|---|---|
| 1,596,652 | 8/1926 | Giovannetti. | |
| 2,588,454 | 3/1952 | Abel. | |
| 2,759,433 | 8/1956 | Szadziewicz et al. | 107—1.1 |
| 2,855,867 | 10/1958 | Zeitlin | 107—1.1 |
| 3,013,509 | 12/1961 | Jahn. | |
| 3,095,832 | 7/1963 | Evans | 107—1.5 |
| 3,112,713 | 12/1963 | Jahn. | |

WALTER A. SCHEEL, *Primary Examiner.*

J. D. BEIN, CHARLES WILLMUTH, ROBERT E. PULFREY, *Examiners.*